US012774710B2

(12) United States Patent
Billich

(10) Patent No.: US 12,774,710 B2

(45) Date of Patent: Oct. 27, 2026

(54) ARRANGEMENT FOR OPERATING A LOAD-CONTROLLED HYDRAULIC SYSTEM OF AN AGRICULTURAL TRACTOR

(71) Applicant: DEERE & COMPANY, Moline, IL (US)

(72) Inventor: Manuel Billich, Dornstadt (DE)

(73) Assignee: DEERE & COMPANY, Moline, IL (US)

( * ) Notice: Subject to any disclaimer, the term of this patent is extended or adjusted under 35 U.S.C. 154(b) by 359 days.

(21) Appl. No.: 18/675,460

(22) Filed: May 28, 2024

(65) Prior Publication Data

US 2025/0003430 A1 Jan. 2, 2025

(30) Foreign Application Priority Data

Jun. 30, 2023 (DE) ......................... 102023117329.4
Jul. 3, 2023 (DE) ......................... 102023117494.0

(51) Int. Cl.
*F15B 11/16* (2006.01)
*B62D 5/07* (2006.01)
*E02F 9/22* (2006.01)

(52) U.S. Cl.
CPC ............ *F15B 11/165* (2013.01); *B62D 5/075* (2013.01); *E02F 9/2232* (2013.01); (Continued)

(58) Field of Classification Search
CPC ..... F15B 11/162; F15B 11/165; F15B 11/168; B62D 5/07; B62D 5/075; E02F 9/2232; E02F 9/2235; E02F 9/225
See application file for complete search history.

(56) References Cited

U.S. PATENT DOCUMENTS 4,463,558 A 8/1984 Miller et al.
4,635,440 A * 1/1987 Kropp .................. F15B 11/162 60/431

(Continued)

FOREIGN PATENT DOCUMENTS

DE 202004010530 U1 12/2004

OTHER PUBLICATIONS

Extended European Search Report and Written Opinion issued in European Patent Application No. 24182147.9 dated Nov. 19, 2024, in 26 pages.

*Primary Examiner* — Michael Leslie

(57) ABSTRACT

An arrangement for operating a load-controlled hydraulic system of an agricultural tractor, includes a hydraulic pump generating a system pressure and having an actuating device to adjust a displacement volume, a hydrostatic vehicle steering system connected to the hydraulic pump and having a steering orbitrol and a first load-indicating pressure, a pressure-regulating valve connected upstream of the steering orbitrol and actuated via a pressure difference decreasing across a throttle element counter to a predetermined restoring force in accordance with the first load-indicating pressure, a second hydraulic consumer connected to the hydraulic pump and feeding a second load-indicating pressure back to a shuttle valve arrangement, which compares and transmits the respectively higher of the first and second load-indicating pressures to the actuating device to adjust the displacement volume, and a pressure-copying valve indirectly feeding back the first load-indicating pressure to the shuttle valve arrangement.

18 Claims, 4 Drawing Sheets

(52) U.S. Cl.
CPC .......... *F15B 11/162* (2013.01); *F15B 11/168* (2013.01); *F15B 2211/20553* (2013.01); *F15B 2211/6054* (2013.01); *F15B 2211/6055* (2013.01); *F15B 2211/6058* (2013.01); *F15B 2211/781* (2013.01)

(56) References Cited

U.S. PATENT DOCUMENTS

| | | | | | |
|---|---|---|---|---|---|
| 5,579,642 | A * | 12/1996 | Wilke | F15B 11/168 91/518 |
| 7,451,686 | B2 * | 11/2008 | Graeve | F15B 11/162 91/516 |
| 7,597,168 | B2 * | 10/2009 | Anderson | B62D 5/32 60/403 |
| 7,918,285 | B1 | 4/2011 | Graham et al. | |
| 8,006,490 | B2 * | 8/2011 | Kauss | F15B 11/168 91/516 |
| 8,429,908 | B2 | 4/2013 | Bauer | |
| 8,495,871 | B2 | 7/2013 | Bitter | |
| 8,869,520 | B2 * | 10/2014 | Vigholm | E02F 9/2235 60/459 |
| 9,084,388 | B2 | 7/2015 | Bitter | |
| 9,133,605 | B2 * | 9/2015 | Pomeroy | E02F 9/2235 |
| 9,284,966 | B2 | 3/2016 | Seebode et al. | |
| 9,671,009 | B2 | 6/2017 | Nystrom et al. | |
| 10,377,414 | B2 * | 8/2019 | Schick | B62D 5/075 |
| 11,326,592 | B2 | 5/2022 | Remmelmann et al. | |
| 11,358,631 | B2 | 6/2022 | Schick et al. | |
| 11,359,649 | B2 | 6/2022 | Meid et al. | |
| 11,377,823 | B1 | 7/2022 | Quinn et al. | |
| 11,378,102 | B1 | 7/2022 | Quinn et al. | |
| 11,378,104 | B1 | 7/2022 | Quinn et al. | |
| 12,352,292 | B2 * | 7/2025 | Billich | A01B 63/00 |
| 12,434,760 | B2 * | 10/2025 | Billich | B60T 13/686 |
| 2008/0047423 | A1 | 2/2008 | Graeve et al. | |
| 2011/0146258 | A1 | 6/2011 | Peters | |
| 2018/0222522 | A1 | 8/2018 | Schick et al. | |

* cited by examiner

ARRANGEMENT FOR OPERATING A LOAD-CONTROLLED HYDRAULIC SYSTEM OF AN AGRICULTURAL TRACTOR

CROSS-REFERENCE TO RELATED APPLICATIONS

This application claims priority to German Patent Application No. 102023117329.4, filed Jun. 30, 2023, and to German Patent Application No. 102023117494.0, filed Jul. 3, 2023, which are hereby incorporated by reference.

FIELD OF THE DISCLOSURE

The disclosure relates to an arrangement for operating a load-controlled hydraulic system of an agricultural tractor.

BACKGROUND

Agricultural tractors can include a hydraulic system with a variable displacement hydraulic pump. The hydraulic system can provide hydraulic flow to various hydraulic consumers of the agricultural tractor. The displacement volume of the hydraulic pump can adjust due to a load-indicating pressure applied at a control input. The hydraulic pump provides a supply of hydraulic fluid corresponding to the load-indicating pressure to the various hydraulic consumers.

SUMMARY

The disclosure relates to an arrangement for operating a load-controlled hydraulic system of an agricultural tractor, comprising a hydraulic pump, which is adjustable in terms of its displacement volume, for supplying hydraulic consumers with pressurized hydraulic fluid, wherein the displacement volume of the hydraulic pump is adjusted in accordance with a load-indicating pressure transmitted to an actuating device of the hydraulic pump. The arrangement also has a first hydraulic consumer, which is designed as a hydrostatic vehicle steering system and has a steering orbitrol, and a pressure-regulating valve, which is connected upstream of the steering orbitrol and is actuated in accordance with a pressure difference that decreases across a throttle element counter to a predetermined restoring force in accordance with a load requirement, represented by a first load-indicating pressure, of the hydrostatic vehicle steering system. At least a second hydraulic consumer, which feeds a load requirement, represented by a second load-indicating pressure, back to a shuttle valve arrangement, is present, wherein the shuttle valve arrangement compares the second load-indicating pressure with the first load-indicating pressure and transmits the respectively higher pressure to the actuating device of the hydraulic pump in order to adjust the displacement volume of the hydraulic pump.

A load-controlled hydraulic system constructed in this manner is used, for example, in 6R series agricultural tractors from the manufacturer John Deere. To this end, the hydraulic system comprises a hydraulic pump, which is supplied with hydraulic fluid from a hydraulic reservoir of the agricultural tractor and the displacement volume of which increases by the magnitude of a load-indicating pressure applied at a control input. In this manner, a hydraulic supply corresponding to the actual power requirement for a multiplicity of hydraulic consumers of the agricultural tractor is possible. These include primary hydraulic consumers, which are used to carry out superordinate hydraulic functions of a hydrostatic vehicle steering system and of a hydraulic braking system, as well as secondary hydraulic consumers for carrying out subordinate hydraulic functions relating to various comfort functions and working functions of the agricultural tractor, such as, for example, of a hydraulic axle suspension or cab suspension, of a working hydraulic unit including supplying hydraulically operated working units of an additional device or mounted device that is attached to the agricultural tractor, but also of a hydraulically actuatable three-point hitch.

In order to ensure an adequate supply of hydraulic energy in the case of a multiplicity of different hydraulic consumers, the specification of the displacement volume is based on the respectively highest of the load-indicating pressures fed back by the hydraulic consumers. For this purpose, provision is made for a shifting logic system, which consists of hydraulic shuttle valves, compares the load-indicating pressures applied at associated load-indicating lines with one another in pairs in a cascade-like manner and transfers the respectively highest pressure to the control input of the hydraulic pump. Depending on the shift state of the shuttle valves, flow circulates through different flow paths, which are used to drain the hydraulic fluid in the direction of a hydraulic reservoir of the hydraulic system, within the shifting logic system. On account of the resulting variations in hydraulic flow in the load-indicating lines, repercussions on the load-indicating pressures applied at said lines cannot be ruled out. In the case of a hydraulic consumer designed as a hydrostatic vehicle steering system, this can result in undesired changes to the steering behavior as a result of the shift state of the shuttle valve arrangement.

The object of the present disclosure is therefore to specify an arrangement of the type mentioned in the introduction that is improved with respect to operation of a hydrostatic vehicle steering system.

This object is achieved by an arrangement for operating a load-controlled hydraulic system of an agricultural tractor having the features of one or more embodiments described herein.

The arrangement for operating a load-controlled hydraulic system of an agricultural tractor comprises a hydraulic pump, which is adjustable in terms of its displacement volume, for supplying hydraulic consumers with pressurized hydraulic fluid, wherein the displacement volume of the hydraulic pump is adjusted in accordance with a load-indicating pressure transmitted to an actuating device of the hydraulic pump. The arrangement also has a first hydraulic consumer, which is designed as a hydrostatic vehicle steering system and has a steering orbitrol, and a pressure-regulating valve, which is connected upstream of the steering orbitrol and is actuated in accordance with a pressure difference that decreases across a throttle element counter to a predetermined restoring force in accordance with a load requirement, represented by a first load-indicating pressure, of the hydrostatic vehicle steering system. At least a second hydraulic consumer, which feeds a load requirement, represented by a second load-indicating pressure, back to a shuttle valve arrangement, is present, wherein the shuttle valve arrangement compares the second load-indicating pressure with the first load-indicating pressure and transmits the respectively higher pressure to the actuating device of the hydraulic pump in order to adjust the displacement volume of the hydraulic pump. In this case, the first load-indicating pressure is fed back to the shuttle valve arrangement merely indirectly via a pressure-copying valve, which is provided for fluidic separation, for which purpose the pressure-copying valve transmits a system pressure, which is generated by means of the hydraulic pump through reduction to a hydraulic pressure that follows the first load-indicating pressure, to the shuttle valve arrangement.

In other words, the first load-indicating pressure is used merely to activate the pressure-copying valve without a significant hydraulic flow occurring. There is no direct fluidic connection to the shuttle valve arrangement, insofar as undesired repercussions on the first load-indicating pressure can be reliably ruled out. In the case of the first hydraulic consumer designed as a hydrostatic vehicle steering system, this ensures a consistent steering behavior that is independent of the shift state of the shuttle valve arrangement.

Load peaks occurring during operation of the hydrostatic vehicle steering system result in a corresponding increase in the pressure difference that decreases across the throttle element and cause an increase in the deflection of the pressure-regulating valve connected upstream of the steering orbitrol in the direction of an open position, which, on account of the short control path, results in a particularly fast-reacting and thus “dynamic” adaptation of a hydraulic pressure generated in order to operate the hydrostatic vehicle steering system. To this end, the pressure difference is predefined in the order of magnitude of from 10 to 20 bar.

The slight but continuous flow of hydraulic fluid through the throttle element in the range from 1 to 5 liters per minute further ensures that a temperature gradient that is present within the hydraulic circuit of the hydrostatic vehicle steering system in the case of a cold start of the agricultural tractor is rapidly overcome, and no jamming, in particular of the steering orbitrol, on account of thermal differences or mechanical stresses caused thereby, occurs. This is particularly relevant at low or wintry external temperatures.

The actuating device provided for adjusting the displacement volume of the hydraulic pump can either be a directly pressure-actuated actuator or an actuator that is electrically actuated in accordance with a pressure detection using sensors. In both cases, the actuator is used to change a pump pivot angle in a targeted manner, wherein the displacement volume of the hydraulic pump increases as the pump pivot angle increases.

Since one and the same hydraulic pump, the delivery capacity of which is, however, limited, is used for operating the hydraulic consumers, different supply priorities are generally assigned to the hydraulic consumers. Thus, hydraulic braking systems and steering systems constitute superordinate hydraulic functions with the highest supply priority. An inadequate supply that results in possible functional impairments is intended to be ruled out as far as possible in these hydraulic consumers. Accordingly, a lower supply priority is assigned by means of a priority valve arrangement to hydraulic consumers that are used to carry out subordinate hydraulic functions, with the objective of restricting the hydraulic supply thereof where necessary in favor of whichever of the hydraulic consumers has the highest supply priority. The subordinate hydraulic functions include, in particular, functions relating to the operation of comfort functions and working functions of the agricultural tractor, such as, for example, of a hydraulic axle suspension or cab suspension, of a working hydraulic unit including supplying hydraulically operated working units of an additional device or mounted device that is attached to the agricultural tractor, but also of a hydraulically actuatable three-point hitch.

Advantageous embodiments of the arrangement according to the disclosure will become apparent from the one or more embodiments described herein.

For example, the pressure-copying valve has a proportional valve, at the inlet side of which the system pressure, which is generated by means of the hydraulic pump, is applied, and at the outlet side of which the hydraulic pressure transmitted to the shuttle valve arrangement is applied, wherein the proportional valve is urged into an open position under the effect of the first load-indicating pressure counter to the hydraulic pressure applied at the outlet side. This is carried out until a pressure equilibrium is established between the inlet and outlet of the proportional valve, wherein the load-indicating pressure transmitted from the pressure-copying valve or the proportional valve to the shuttle valve arrangement then corresponds to the first load-indicating pressure, except for an offset, which is caused by a restoring force, which urges the pressure-copying valve into a closed position, of a spring element. The offset is typically in the order of magnitude of from 1 to 4 bar.

In terms of the provision of the system pressure, various variants are conceivable. On the one hand, it is possible for the system pressure to be a hydraulic pressure applied at a delivery outlet of the hydraulic pump. This is usually in the order of magnitude of from 200 to 250 bar. On the other hand, it can also be a hydraulic pressure generated by the hydraulic pump in order to operate the hydrostatic vehicle steering system. This pressure corresponds substantially to the first load-indicating pressure plus the pressure difference that decreases across the throttle element and is between 190 and 240 bar. The choice between the two variants ultimately depends on the installation space available in each individual case for routing the corresponding supply lines.

Moreover, there is the possibility of the hydraulic pressure transmitted from the pressure-regulating valve to the shuttle valve arrangement, and thus ultimately the hydraulic pressure generated in order to operate the hydrostatic vehicle steering system, being able to be limited by means of a pressure-limiting valve that opens into a hydraulic reservoir according to a predefined maximum value. The pressure-limiting valve is attached, in particular, to the outlet of the pressure-copying valve or of the proportional valve comprised by the latter. The maximum value is predefined in the range from 170 to 200 bar.

In order to avoid the hydraulic losses occurring when the pressure-limiting valve is being shifted in the direction of the hydraulic reservoir, it is, however, also conceivable for a pressure-regulating valve, by means of which the hydraulic pressure transmitted to the shuttle valve arrangement can be limited to a predefined maximum value at an outlet that communicates with the shuttle valve arrangement, to be provided instead of a pressure-limiting valve. The specification of the maximum value is based on the abovementioned maximum value.

Provision can also be made for the hydraulic pressure transmitted to the actuating device of the hydraulic pump to be able to be limited by means of a further pressure-regulating valve to a predefined maximum value at an outlet that communicates with the actuating device. The maximum value is specified in such a manner that the hydraulic pressure generated at the delivery outlet of the hydraulic pump does not exceed a value of 200 and 250 bar. Damage caused by overpressure to the hydraulic system or to the hydraulic consumers or peripheral components operated thereby can thus be reliably prevented. The use of a pressure-regulating valve ensures that the hydraulic pressure generated at the outlet side, and thus at the delivery outlet of the hydraulic pump, remains constant in the sense of a stable hydraulic supply once the predefined maximum value has been reached.

For example, a drainage connection in the direction of a hydraulic reservoir is established by means of a further throttle element connected to the outlet of the further pressure-regulating valve. The further throttle element allows the hydraulic pressure transmitted to the actuating device of the hydraulic pump to be relieved in the case in which, on account of a reduced load requirement that has been fed back by the hydraulic consumers, a corresponding reduction in the displacement volume by pivoting the hydraulic pump back is necessary.

The above and other features will become apparent from the following detailed description and accompanying drawings.

BRIEF DESCRIPTION OF THE DRAWINGS

The arrangement according to the disclosure will be explained in more detail below with reference to the appended drawings. In this case, corresponding reference signs relate to identical components or components that are comparable with respect to their function. In the drawings.

DETAILED DESCRIPTION

The embodiments or implementations disclosed in the above drawings and the following detailed description are not intended to be exhaustive or to limit the present disclosure to these embodiments or implementations.

Figure 1:
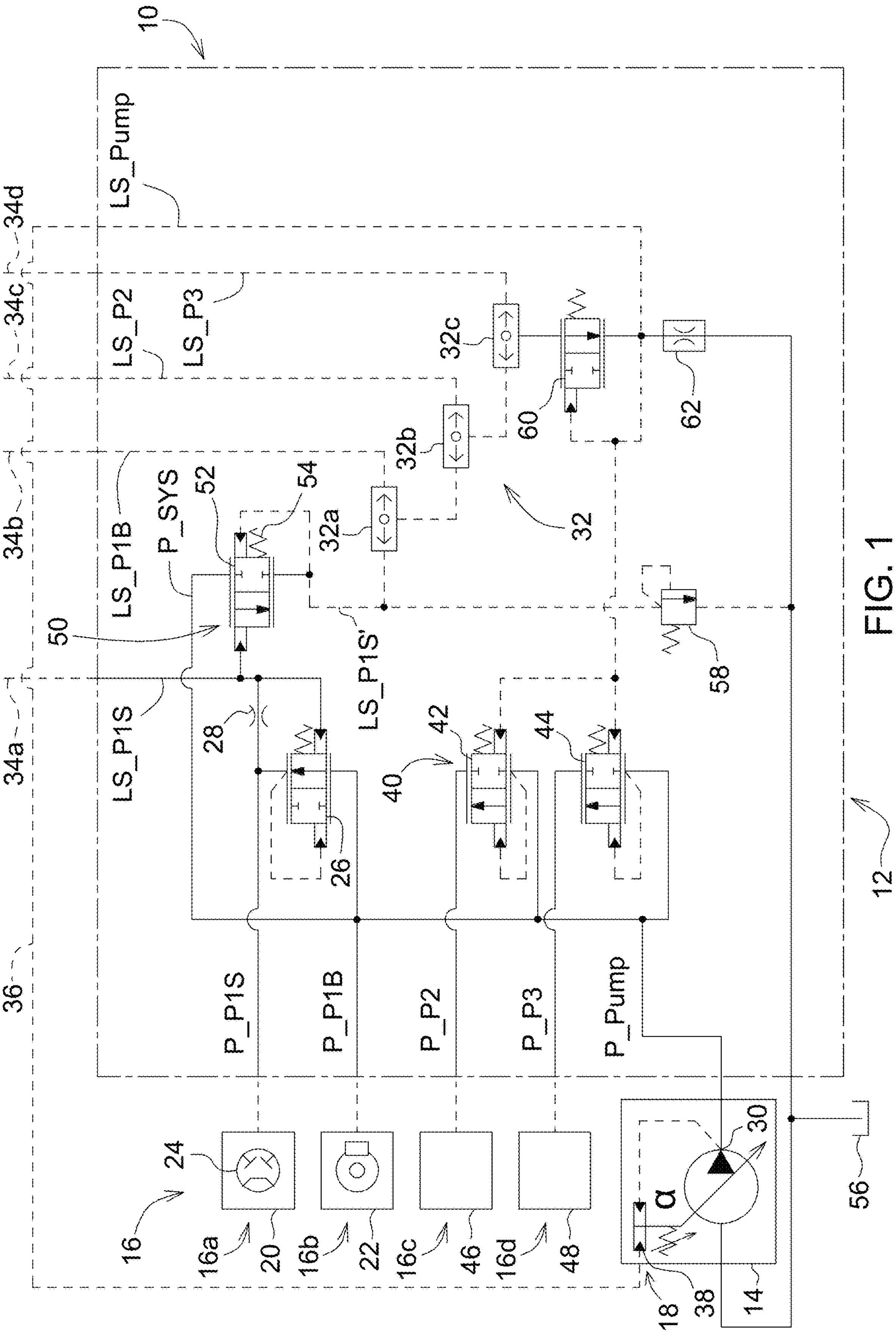
FIG. 1 shows a schematically illustrated first exemplary embodiment of the arrangement according to the disclosure for operating a load-controlled hydraulic system of an agricultural tractor.

FIG. 1 shows a schematically illustrated first exemplary embodiment of the arrangement according to the disclosure for operating a load-controlled hydraulic system of an agricultural tractor, which is not depicted.

The arrangement 10 comprises, as part of the load-controlled hydraulic system 12, a hydraulic pump 14, which is adjustable in terms of its displacement volume, for supplying a multiplicity of hydraulic consumers 16 with pressurized hydraulic fluid. The displacement volume of the hydraulic pump 14 is adjusted in accordance with a load-indicating pressure LS_Pump transmitted to an actuating device 18 of the hydraulic pump 14. This allows a hydraulic supply corresponding to the actual power requirement for the hydraulic consumers 16.

For example, the hydraulic consumers 16 depicted in FIG. 1 include first and second (primary) hydraulic consumers 16*a*, 16*b*, which are used to carry out superordinate hydraulic functions of a hydrostatic vehicle steering system 20 and of a hydraulic braking system 22, as well as a plurality of further (secondary) hydraulic consumers 16*c*, 16*d* for carrying out subordinate hydraulic functions relating to various comfort functions and working functions of the agricultural tractor, such as, for example, of a hydraulic axle suspension or cab suspension, of a working hydraulic unit including supplying hydraulically operated working units of an additional device or mounted device that is attached to the agricultural tractor, but also of a hydraulically actuatable three-point hitch.

In this case, the first hydraulic consumer 16*a* or the hydrostatic vehicle steering system 20 has a steering orbitrol 24 and a first pressure-regulating valve 26, which is connected upstream of the steering orbitrol 24 and is actuated in accordance with a pressure difference that decreases across a throttle element 28 counter to a predetermined restoring force in accordance with a load requirement, represented by a first load-indicating pressure LS_P1S, of the hydrostatic vehicle steering system 20.

In this manner, a hydraulic pressure P_Pump applied at a delivery outlet 30 of the hydraulic pump 14 is reduced to a supply pressure P_P1S corresponding to the first load-indicating pressure LS_P1S, whereas a supply pressure P_P1B provided for operating the hydraulic braking system 22 is directly tapped off at the delivery outlet 30 of the hydraulic pump 14.

The first load-indicating pressure LS_P1S is fed back, together with a second load-indicating pressure LS_P1B, which represents a load requirement of the hydraulic braking system 22, and further load-indicating pressures LS_P2, LS_P3 resulting on account of associated load requirements of the further hydraulic consumers 16*c*, 16*d*, to a shuttle valve arrangement 32.

In order to ensure an adequate supply of hydraulic energy, the specification of the displacement volume of the hydraulic pump 14 is based on the respectively highest of the load-indicating pressures LS_P1S, LS_P1B, LS_P2, LS_P3 fed back by the hydraulic consumers 16. For this purpose, the shuttle valve arrangement 32 forms a shifting logic system, which consists of hydraulic shuttle valves 32*a*, 32*b*, 32*c* and compares the load-indicating pressures LS_P1S, LS_P1B, LS_P2, LS_P3 applied at associated load-indicating lines 34*a*, 34*b*, 34*c*, 34*d* with one another in pairs in a cascade-like manner and transfers or transmits the respectively highest pressure to the actuating device 18 of the hydraulic pump 14 via a feedback line 36.

In the present case, the actuating device 18 provided for adjusting the displacement volume of the hydraulic pump 14 is a directly pressure-actuated actuator 38. In a departure therefrom, the actuating device 18 can however also be designed as an actuator that is electrically actuated in accordance with a pressure detection using sensors. In both cases, the actuator is used to change a pump pivot angle $\alpha$ in a targeted manner, wherein the displacement volume of the hydraulic pump 14 increases as the pump pivot angle $\alpha$ increases.

Since one and the same hydraulic pump 14, the delivery capacity of which is, however, limited, is used for operating the hydraulic consumers 16, different supply priorities are assigned to the hydraulic consumers 16. In this case, the hydrostatic vehicle steering system 20 as well as the hydraulic braking system 22 constitute superordinate hydraulic functions with the highest supply priority. An inadequate supply that results in possible functional impairments is intended to be ruled out as far as possible in these hydraulic consumers 16*a*, 16*b*. Accordingly, a lower supply priority is assigned by means of a priority valve arrangement 40 to the further hydraulic consumers 16*b*, 16*c* in view of the fact that they are used to carry out merely subordinate hydraulic functions, with the objective of restricting the hydraulic supply thereof where necessary in favor of whichever of the two hydraulic consumers 16_a_, 16_b_ has the higher supply priority.

In this case, the first and second hydraulic consumers 16_a_, 16_b_ are directly connected or connectable to the delivery outlet 30 of the hydraulic pump 14, whereas the further hydraulic consumers 16_c_, 16_d_ are connected or connectable to said delivery outlet via interposed second and third pressure-regulating valves 42, 44, which are part of the priority valve arrangement 40 and are used to provide associated supply pressures P_P2, P_P3. The further hydraulic consumers 16_c_, 16_d_ are subdivided into first and second groups 46, 48, respectively, wherein the first group 46 can be connected to the delivery outlet 30 of the hydraulic pump 14 via the second pressure-regulating valve 42, and the second group 48 can be connected to said delivery outlet via the third pressure-regulating valve 44. The illustration of two groups 46, 48 is intended in this case to have a merely exemplary character; provision can also be made for a number of groups or pressure-regulating valves that differs therefrom.

If, in accordance with the exemplary embodiment of the arrangement 10 depicted in FIG. 1, provision is made for a plurality of pressure-regulating valves 42, 44, these are thus brought into their closed position in a predefined sequence, specifically with a successive decrease in the difference between the hydraulic pressure P_Pump applied at the delivery outlet 30 of the hydraulic pump 14 and the hydraulic pressure LS_Pump transmitted to the actuating device 18 of the hydraulic pump 14 below a first or second threshold value P_P2_min, P_P3_min (P_P2_min>P_P3_min), in order to reduce the power requirement in accordance with the delivery capacity of the hydraulic pump 14.

This allows the supply priorities of the further hydraulic consumers 16_c_, 16_d_ to be further subdivided or gradated, so that the operation of specific hydraulic functions can be maintained as far as possible. Thus, in terms of the sequence of throttling the hydraulic volumetric flow passing through the two pressure-regulating valves 42, 44, provision can be made for comfort functions to be affected first of all and for any working functions, including hydraulic transmission control of a gearbox and/or power take-off transmission comprised by a drivetrain of the agricultural tractor, to be affected subsequently.

As can also be seen in FIG. 1, the first load-indicating pressure LS_P1S is fed back to the shuttle valve arrangement 32 merely indirectly via a pressure-copying valve 50, which is provided for fluidic separation, for which purpose the pressure-copying valve 50 transmits a system pressure P_Sys, which is generated by means of the hydraulic pump 14 through reduction to a hydraulic pressure LS_P1S' that follows the first load-indicating pressure LS_P1S, to the shuttle valve arrangement 32.

In other words, the first load-indicating pressure LS_P1S is used merely to activate the pressure-copying valve 50 without a significant hydraulic flow occurring. There is no direct fluidic connection to the shuttle valve arrangement 32, insofar as undesired repercussions on the first load-indicating pressure LS_P1S can be reliably ruled out. In the case of the first hydraulic consumer 16_a_ designed as a hydrostatic vehicle steering system 20, this ensures a consistent steering behavior that is independent of the shift state of the shuttle valve arrangement 32.

Load peaks occurring during operation of the hydrostatic vehicle steering system 20 result in a corresponding increase in the pressure difference that decreases across the throttle element 28 and cause an increase in the deflection of the first pressure-regulating valve 26 connected upstream of the steering orbitrol 24 in the direction of an open position, which, on account of the short control path, results in a particularly fast-reacting and thus "dynamic" adaptation of the hydraulic pressure P_P1S generated in order to operate the hydrostatic vehicle steering system 20. To this end, the pressure difference is predefined in the order of magnitude of from 10 to 20 bar.

The slight but continuous flow of hydraulic fluid through the throttle element 28 in the range from 1 to 5 liters per minute further ensures that a temperature gradient that is present within the hydraulic circuit of the hydrostatic vehicle steering system 20 in the case of a cold start of the agricultural tractor is rapidly overcome, and no jamming, in particular of the steering orbitrol 24, on account of thermal differences or mechanical stresses caused thereby, occurs. This is particularly relevant at low or wintry external temperatures.

According to FIG. 1, the pressure-copying valve 50 has a proportional valve 52, at the inlet side of which the system pressure P_Sys, which is generated by means of the hydraulic pump 14, is applied, and at the outlet side of which the hydraulic pressure LS_P1S' transmitted to the shuttle valve arrangement 32 is applied, wherein the proportional valve 52 is urged into an open position under the effect of the first load-indicating pressure LS_P1S counter to the hydraulic pressure LS_P1S' applied at the outlet side. This is carried out until a pressure equilibrium is established between the inlet and outlet of the proportional valve 52, wherein the load-indicating pressure LS_P1S' transmitted from the pressure-copying valve 50 or the proportional valve 52 to the shuttle valve arrangement 32 then corresponds to the first load-indicating pressure LS_P1S, except for an offset, which is caused by a restoring force, which urges the pressure-copying valve 50 into a closed position, of a spring element 54. The offset is typically in the order of magnitude of from 1 to 4 bar.

In terms of the provision of the system pressure P_Sys, various variants are conceivable. On the one hand, according to FIG. 1, it is possible for the system pressure P_Sys to be the hydraulic pressure P_Pump applied at the delivery outlet 30 of the hydraulic pump 14. This is usually in the order of magnitude of from 200 to 250 bar. On the other hand, according to FIG. 2, it can also be the hydraulic pressure P_P1S generated by the hydraulic pump 14 in order to operate the hydrostatic vehicle steering system 20. This pressure corresponds substantially to the first load-indicating pressure LS_P1S plus the pressure difference that decreases across the throttle element 28 and is between 190 and 240 bar.

Figure 2:
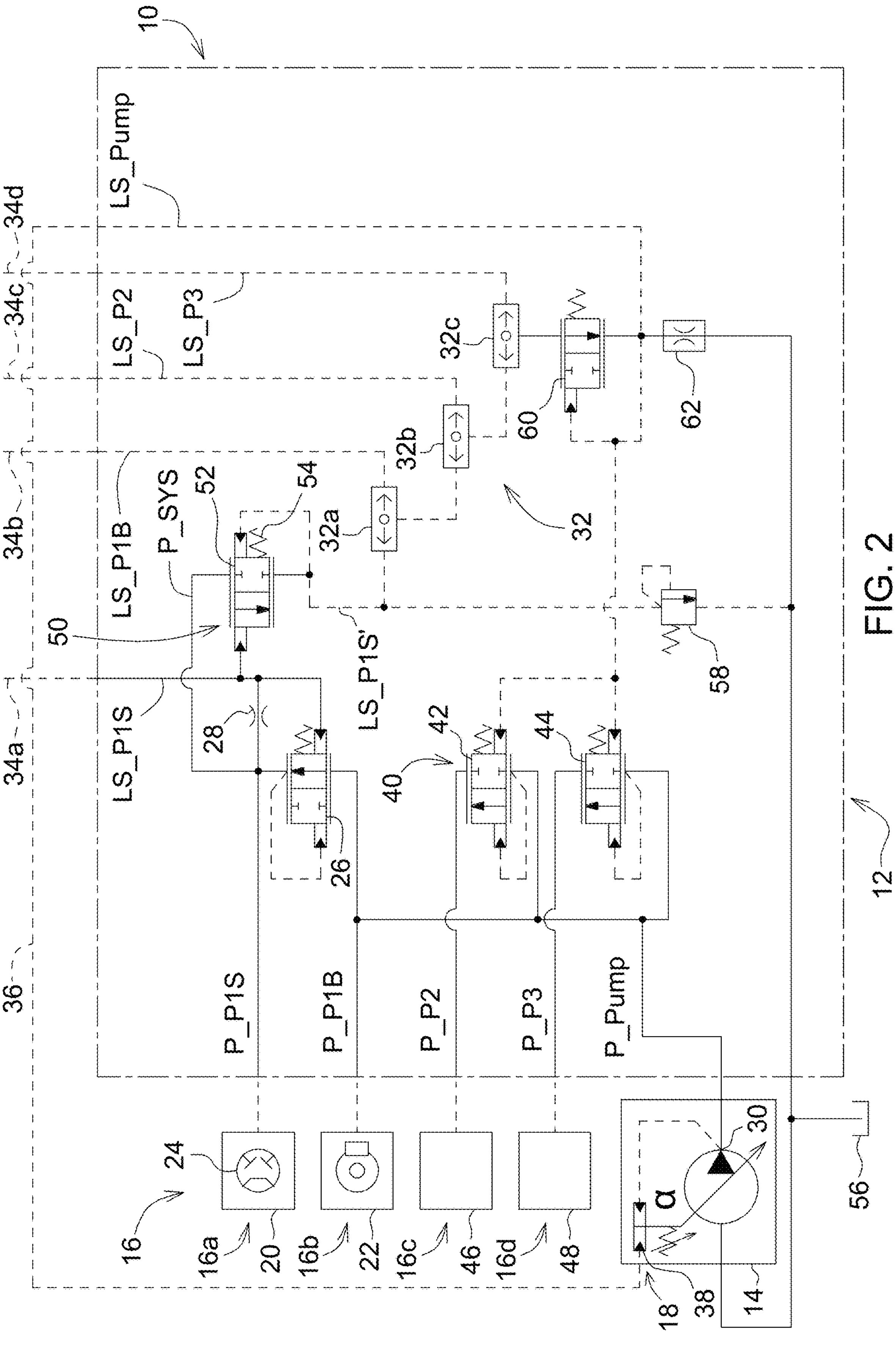
FIG. 2 shows a variant of the first exemplary embodiment of the arrangement according to the disclosure depicted in FIG. 1.

In the case of the first exemplary embodiment depicted in FIGS. 1 and 2, the hydraulic pressure LS_P1S' transmitted from the first pressure-regulating valve 26 to the shuttle valve arrangement 32, and thus ultimately the hydraulic pressure P_P1S generated in order to operate the hydrostatic vehicle steering system 20, can be limited by means of a pressure-limiting valve 58 that opens into a hydraulic reservoir 56 according to a predefined maximum value P_P1S_max. The pressure-limiting valve 58 is attached to the outlet of the pressure-copying valve 50 or of the proportional valve 52 comprised by the latter. The maximum value P_P1S_max is predefined in the range from 170 to 200 bar.

In addition, the hydraulic pressure LS_Pump transmitted to the actuating device 18 of the hydraulic pump 14 can be limited by means of a pressure-regulating valve 60 to a predefined maximum value LS_Pump_max at an outlet that communicates with the actuating device 18. The maximum value LS_Pump_max is specified in such a manner that the hydraulic pressure P_Pump generated at the delivery outlet 30 of the hydraulic pump 14 does not exceed a value of 200 and 250 bar. Damage caused by overpressure to the hydraulic system or to the hydraulic consumers or peripheral components operated thereby can thus be reliably prevented. The use of the pressure-regulating valve 60 ensures that the hydraulic pressure P_Pump generated at the outlet side, and thus at the delivery outlet 30 of the hydraulic pump 14, remains constant in the sense of a stable hydraulic supply once the predefined maximum value LS_Pump_max has been reached.

A drainage connection in the direction of the hydraulic reservoir 56 is established by means of a further throttle element 62 connected to the outlet of the pressure-regulating valve 60. The further throttle element 62 allows the hydraulic pressure LS_Pump transmitted to the actuating device 18 of the hydraulic pump 14 to be relieved in the case in which, on account of a reduced load requirement that has been fed back by the hydraulic consumers 16, a corresponding reduction in the displacement volume by pivoting the hydraulic pump 14 back is necessary.

Figure 3:
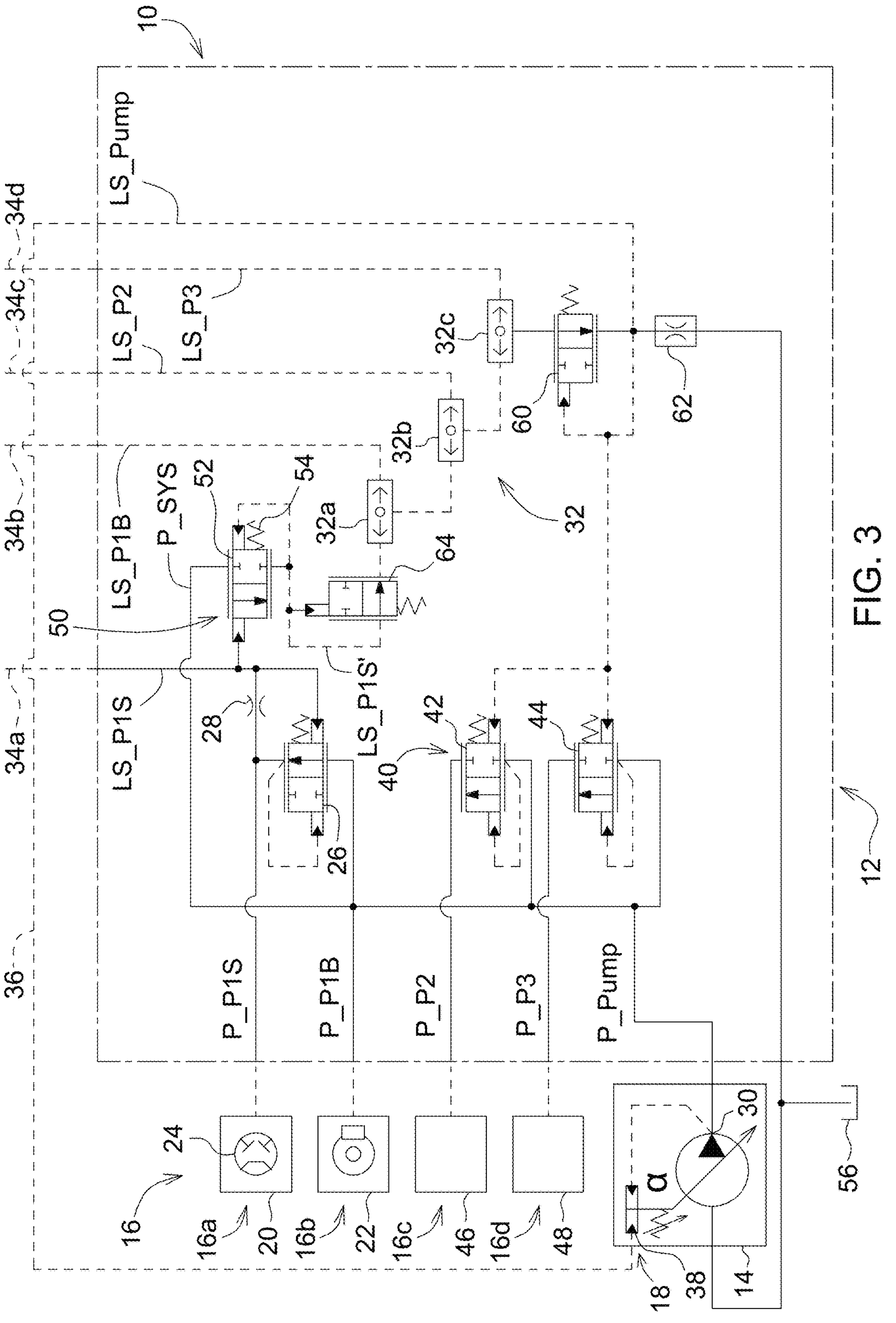
FIG. 3 shows a schematically illustrated second exemplary embodiment of the arrangement according to the disclosure for operating a load-controlled hydraulic system of an agricultural tractor.
Figure 4:
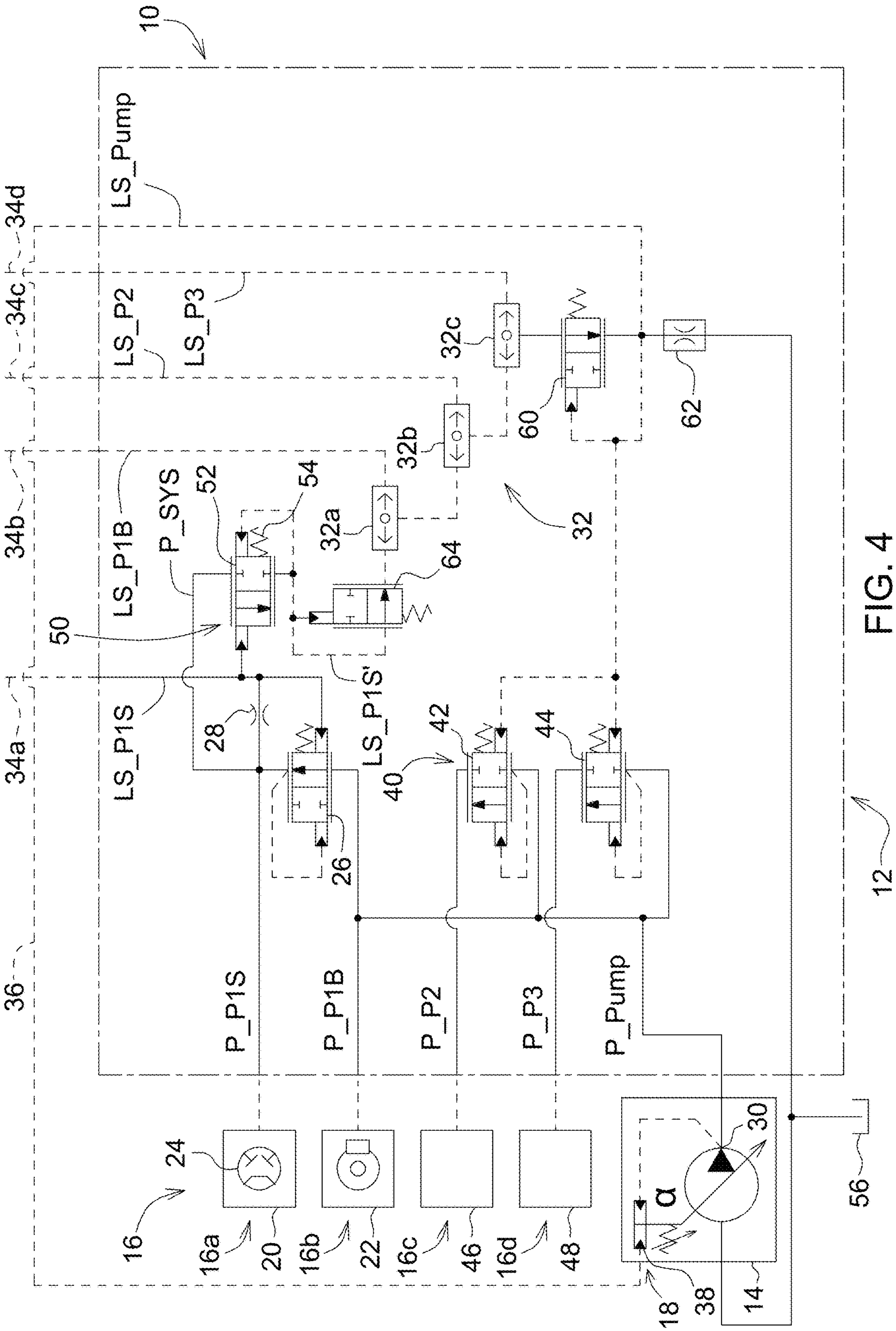
FIG. 4 shows a variant of the second exemplary embodiment of the arrangement according to the disclosure depicted in FIG. 3.

If the hydraulic losses occurring when the pressure-limiting valve 58 is being shifted in the direction of the hydraulic reservoir 56 are to be avoided, in the case of a second exemplary embodiment of the arrangement 10 according to the disclosure depicted in FIGS. 3 and 4, a further pressure-regulating valve 64, by means of which the hydraulic pressure LS_P1S' transmitted to the shuttle valve arrangement 32 can be limited to a predefined maximum value LS_P1S' max at an outlet that communicates with the shuttle valve arrangement 32, is thus provided instead of the pressure-limiting valve 58. The specification of the maximum value LS_P1S' max is based on the abovementioned maximum value P_P1S_max and is approximately 10 to 20 bar below the latter.

FIGS. 3 and 4 differ in turn with respect to the provision of the system pressure P_Sys. In order to avoid repetitions, reference should therefore be made to the relevant description of the variants in question in conjunction with FIGS. 1 and 2.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An arrangement for operating a load-controlled hydraulic system of an agricultural tractor, comprising:

a hydraulic pump generating a system pressure and having an actuating device to adjust a displacement volume;

a hydrostatic vehicle steering system connected to the hydraulic pump and having a steering orbitrol and a first load-indicating pressure;

a pressure-regulating valve connected upstream of the steering orbitrol and actuated via a pressure difference decreasing across a throttle element counter to a predetermined restoring force in accordance with the first load-indicating pressure;

a second hydraulic consumer connected to the hydraulic pump and feeding a second load-indicating pressure back to a shuttle valve arrangement, which compares and transmits the respectively higher of the first and second load-indicating pressures to the actuating device to adjust the displacement volume; and a pressure-copying valve indirectly feeding back the first load-indicating pressure to the shuttle valve arrangement by transmitting the system pressure reduced to a hydraulic pressure that follows the first load-indicating pressure, the pressure-copying valve including a proportional valve with an inlet side of which the system pressure is applied and an outlet side of which the hydraulic pressure transmitted to the shuttle valve arrangement is applied, the proportional valve being urged into an open position under the effect of the first load-indicating pressure counter to the hydraulic pressure applied at the outlet side.

2. The arrangement of claim 1, wherein the system pressure is a hydraulic pressure at a delivery outlet of the hydraulic pump.

3. The arrangement of claim 1, wherein the system pressure is a hydraulic pressure generated by the hydraulic pump to operate the hydrostatic vehicle steering system.

4. The arrangement of claim 1, wherein the hydraulic pressure transmitted from the pressure-regulating valve to the shuttle valve arrangement can be limited via a pressure-limiting valve that opens into a hydraulic reservoir according to a predefined maximum value.

5. The arrangement of claim 1, further comprising a pressure-limiting valve limiting the hydraulic pressure transmitted to the shuttle valve arrangement to a predefined maximum value.

6. The arrangement of claim 1, further comprising an additional pressure-regulating valve limiting the hydraulic pressure transmitted to the actuating device of the hydraulic pump to a predefined maximum value.

7. The arrangement of claim 6, further comprising a throttle element connected between the additional pressure-regulating valve and a hydraulic reservoir.

8. An agricultural tractor, comprising:
- a hydraulic pump generating a system pressure and adjustable in terms of a displacement volume;
- a hydrostatic vehicle steering system connected to the hydraulic pump and having a steering orbitrol and a first load-indicating pressure;
- a pressure-regulating valve connected upstream of the steering orbitrol and actuated via a pressure difference decreasing across a throttle element counter to a predetermined restoring force in accordance with the first load-indicating pressure;
- a second hydraulic consumer connected to the hydraulic pump and feeding a second load-indicating pressure back to a shuttle valve arrangement, which compares and transmits the respectively higher of the first and second load-indicating pressures to an actuating device of the hydraulic pump to adjust the displacement volume; and
- a pressure-copying valve indirectly feeding back the first load-indicating pressure to the shuttle valve arrangement by transmitting the system pressure reduced to a hydraulic pressure that follows the first load-indicating pressure, the pressure-copying valve including a proportional valve with an inlet side of which the system pressure is applied and an outlet side of which the hydraulic pressure transmitted to the shuttle valve arrangement is applied, the proportional valve being urged into an open position under the effect of the first load-indicating pressure counter to the hydraulic pressure applied at the outlet side.

9. The agricultural tractor of claim 8, wherein the system pressure is a hydraulic pressure at a delivery outlet of the hydraulic pump.

10. The agricultural tractor of claim 8, wherein the system pressure is a hydraulic pressure generated by the hydraulic pump to operate the hydrostatic vehicle steering system.

11. The agricultural tractor of claim 8, wherein the hydraulic pressure transmitted from the pressure-regulating valve to the shuttle valve arrangement can be limited via a pressure-limiting valve that opens into a hydraulic reservoir according to a predefined maximum value.

12. The agricultural tractor of claim 8, further comprising a pressure-limiting valve limiting the hydraulic pressure transmitted to the shuttle valve arrangement to a predefined maximum value.

13. The agricultural tractor of claim 8, further comprising an additional pressure-regulating valve limiting the hydraulic pressure transmitted to the actuating device of the hydraulic pump to a predefined maximum value.

14. The agricultural tractor of claim 13, further comprising a throttle element connected between the additional pressure-regulating valve and a hydraulic reservoir.

15. An arrangement for operating a load-controlled hydraulic system of an agricultural tractor, comprising:
- a hydraulic pump generating a system pressure and having an actuating device to adjust a displacement volume;
- a hydrostatic vehicle steering system connected to the hydraulic pump and having a steering orbitrol and a first load-indicating pressure;
- a pressure-regulating valve connected upstream of the steering orbitrol and actuated via a pressure difference decreasing across a throttle element counter to a predetermined restoring force in accordance with the first load-indicating pressure;
- a second hydraulic consumer connected to the hydraulic pump and feeding a second load-indicating pressure back to a shuttle valve arrangement, which compares and transmits the respectively higher of the first and second load-indicating pressures to the actuating device to adjust the displacement volume;
- a pressure-copying valve indirectly feeding back the first load-indicating pressure to the shuttle valve arrangement by transmitting the system pressure reduced to a hydraulic pressure that follows the first load-indicating pressure; and
- a pressure-limiting valve limiting the hydraulic pressure transmitted to the shuttle valve arrangement to a predefined maximum value.

16. The arrangement of claim 15, wherein the pressure-limiting valve limits the hydraulic pressure transmitted from the pressure-regulating valve to the shuttle valve arrangement, and the pressure-limiting valve opens into a hydraulic reservoir according to the predefined maximum value.

17. The arrangement of claim 15, further comprising an additional pressure-regulating valve limiting the hydraulic pressure transmitted to the actuating device of the hydraulic pump to a predefined maximum value.

18. The arrangement of claim 17, further comprising a throttle element connected between the additional pressure-regulating valve and a hydraulic reservoir.

* * * * *